United States Patent
Creet et al.

(10) Patent No.: US 10,625,690 B2
(45) Date of Patent: Apr. 21, 2020

(54) VEHICLE CEILING CONNECTING ARRANGEMENT

(71) Applicant: Volvo Car Corporation, Göteborg (SE)

(72) Inventors: Robert Creet, Göteborg (SE); Niclas Mjörnestål, Mellerud (SE); Hans Larsson, Göteborg (SE); Magnus Bergman, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/172,994

(22) Filed: Oct. 29, 2018

(65) Prior Publication Data
US 2019/0126854 A1 May 2, 2019

(30) Foreign Application Priority Data
Oct. 30, 2017 (EP) .................................... 17199160

(51) Int. Cl.
*B60R 13/02* (2006.01)
*F16B 5/06* (2006.01)
*F16B 5/12* (2006.01)

(52) U.S. Cl.
CPC ...... *B60R 13/0206* (2013.01); *B60R 13/0212* (2013.01); *B60R 13/0225* (2013.01); *F16B 5/121* (2013.01)

(58) Field of Classification Search
CPC ............ B60R 13/0206; B60R 12/2012; B60R 13/0225; B60R 13/0212; F16B 5/121
USPC ........................................ 296/214, 39.1, 1.08
See application file for complete search history.

(56) References Cited

FOREIGN PATENT DOCUMENTS

| DE | 1555222 A1 | 8/1970 |
|---|---|---|
| EP | 1666309 A1 | 6/2006 |
| FR | 2384655 A1 | 10/1978 |

OTHER PUBLICATIONS

Jul. 10, 2018 European Search Report issue on International Application No. EP17199160.

*Primary Examiner* — Dennis H Pedder
(74) *Attorney, Agent, or Firm* — Clements Bernard Walker; Christopher L. Bernard

(57) ABSTRACT

A vehicle ceiling connecting arrangement for attaching a vehicle ceiling to a vehicle structure of a vehicle. The vehicle ceiling connecting arrangement comprising a vehicle structure connection portion and a ceiling attachment element, wherein the vehicle ceiling connecting arrangement is configured to assume a ceiling attachment state in which a portion of the vehicle ceiling is sandwiched between a first surface of the vehicle structure and a ceiling clamping surface of the ceiling attachment element.

12 Claims, 5 Drawing Sheets

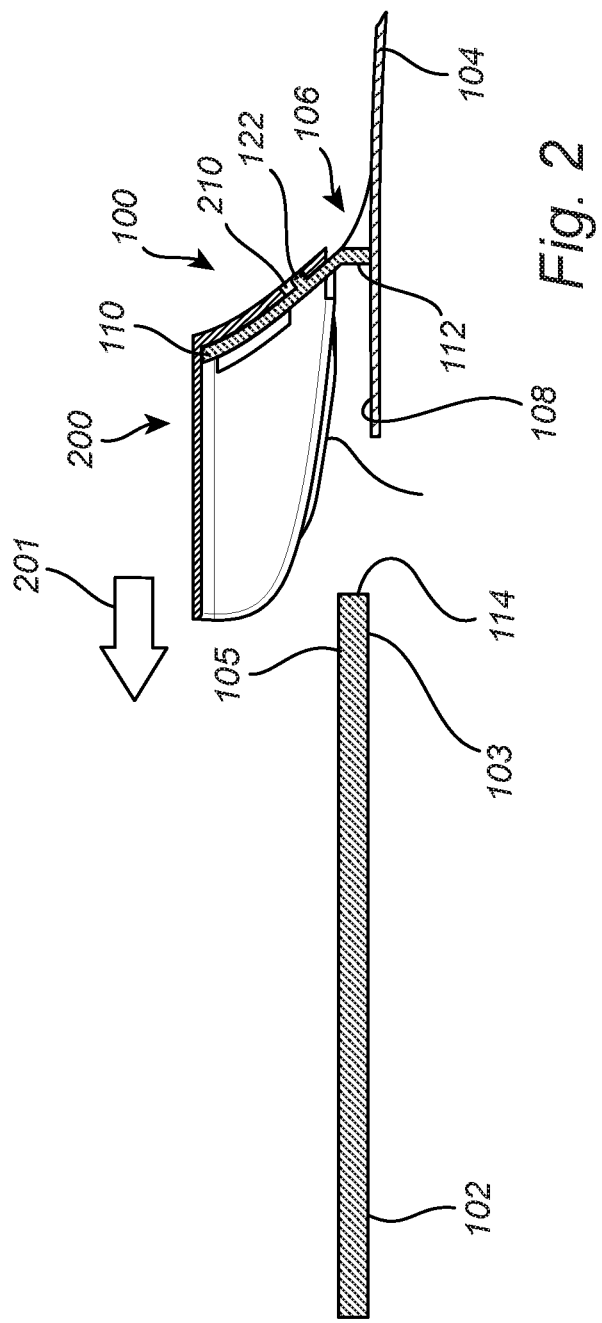

VEHICLE CEILING CONNECTING ARRANGEMENT

CROSS-REFERENCE TO RELATED APPLICATION

The present patent application/patent claims the benefit of priority of co-pending European Patent Application No. 17199160.7, filed on Oct. 30, 2017, and entitled "A VEHICLE CEILING CONNECTING ARRANGEMENT," the contents of which are incorporated in full by reference herein.

TECHNICAL FIELD

The present invention relates to a vehicle ceiling connecting arrangement for attaching a vehicle ceiling to a vehicle structure. The invention also relates to a ceiling attachment element and a vehicle comprising the vehicle ceiling connecting arrangement.

BACKGROUND

In the field of vehicles, in particular cars, there is a continuous strive to improve both the interior as well as the exterior of the vehicle. Improvements relate both to function as well as reduction of cost of various vehicle components as the demands from the market are continuously increasing.

With regards to the interior of the vehicle, there is always a desire as well as a requirement from the customer that various components are well positioned in place and function as expected. Hence, an interior component or assembly should, even after successive use, maintain its function and not be disconnected from its intended position. It is also desirable that the components/assemblies within the vehicle compartment are easy to mount and replace.

The vehicle ceiling, also referred to as the vehicle headliner, is one such vehicle component/assembly that may be challenging to assemble as well as to maintain in the desired position relative to the vehicle structure, such as e.g. the D-pillar of the vehicle. In particular, there is a desire that the vehicle ceiling is sufficiently connected to the vehicle structure. At the same time, connection elements arranged to connect the vehicle ceiling to the vehicle structure should preferably not be visible from the interior of the vehicle. These desires make it rather difficult to attach the vehicle ceiling to the vehicle structure. There is thus a desire to improve the connection between the vehicle ceiling and the vehicle structure.

SUMMARY

It is an object of the present invention to provide a vehicle ceiling connecting arrangement which at least partially overcomes the above described deficiencies. This is achieved by a vehicle ceiling connecting arrangement according to the claims.

According to a first aspect of the present invention, there is provided a vehicle ceiling connecting arrangement for attaching a vehicle ceiling to a vehicle structure of a vehicle, the vehicle ceiling connecting arrangement comprising: a vehicle structure connection portion arranged at a first surface of the vehicle structure, the first surface facing away from an inner compartment of the vehicle, wherein the vehicle structure connection portion comprises an elongated portion extending from the first surface of the vehicle structure in a non-parallel direction relative to the first surface of the vehicle structure; and a ceiling attachment element connectable to the vehicle structure connection portion, the ceiling attachment element comprising a ceiling clamping surface and a recess portion extending in a non-parallel direction from the ceiling clamping surface, wherein the vehicle ceiling connecting arrangement is configured to assume a ceiling attachment state in which a portion of the vehicle ceiling is sandwiched between the first surface of the vehicle structure and the ceiling clamping surface, the ceiling attachment state is assumed when the elongated portion of the vehicle structure connection portion is inserted into the recess portion.

The wording "vehicle structure" should in the following be understood to include various structures within the vehicle compartment at which the vehicle ceiling can be attached. The vehicle structure can, for example, relate to a panel keeping the vehicle ceiling in its position within the vehicle compartment. The panel may in turn be connected to the vehicle chassis or other component. The panel may, for example and as also described below, relate to a vehicle D-pillar structure wherein the vehicle structure connecting portion is arranged on the first surface facing away from the inner compartment of the vehicle, and is thus not viewable to the occupants inside the vehicle compartment. The vehicle structure may off course relate to other structures within the vehicle compartment which are arranged to keep the vehicle ceiling in position, such as e.g. the A-pillar panel, B-pillar panel, etc.

Furthermore, the "vehicle ceiling" should be construed as inner roof of the vehicle which is viewable by the occupants within the vehicle. Such vehicle ceiling may also be referred to as headliner.

An advantage is that by means of the ceiling attachment element, an improved fit between the vehicle structure and the vehicle ceiling is achieved. This is due to the fact that the ceiling attachment element comprises the above defined ceiling clamping surface which provides for an improved fit in comparison to the sole use of the vehicle structure connection portion for connecting the vehicle ceiling. The ceiling clamping surface may thus, as will be described below, be arranged at an angle such as to be arranged substantially parallel to the first surface of the vehicle structure.

Furthermore, by means of the vehicle structure connection portion in combination with the ceiling attachment element, the interchangeability of the vehicle ceiling is improved as the ceiling attachment element can be easily removed from the vehicle structure connection portion. Also, the ceiling attachment element presents an improved connection to the vehicle structure in comparison to the use of e.g. a Velcro fastening arrangement, etc.

According to an example embodiment, the ceiling clamping surface may be substantially parallel to the first surface of the vehicle structure when the vehicle ceiling connecting arrangement assumes the ceiling attachment state.

The parallel surface should be construed such that the surface normal of the ceiling clamping surface and the surface normal of the first surface are facing each other. Hence, the surfaces normal are arranged in opposite direction in comparison to each other. It is appreciated that e.g. the first surface may be curved and that it is the portion of the first surface at which the vehicle ceiling is sandwiched that should be construed as parallel to the ceiling clamping surface.

As described above, improved clamping between the vehicle structure and the ceiling attachment element may be achieved.

According to an example embodiment, the ceiling clamping surface may be arranged on each side of the recess portion.

Hereby, a substantially symmetric element is provided whereby the ceiling clamping surface can be made larger in size for improved attachment to the vehicle structure. Each side of the recess portion should preferably be construed as each side of the elongated portion of the first surface when the ceiling attachment element is connected to the vehicle structure connection portion.

According to an example embodiment, an inner end surface of the elongated portion may be arranged in abutment with an edge surface of the vehicle ceiling when the vehicle ceiling connecting arrangement assumes the ceiling attachment state.

Hereby, the vehicle ceiling can be arranged towards the end position where it connects to the inner end surface of the elongated portion, whereby the ceiling attachment element fixates the vehicle ceiling to the vehicle structure, or in more detail, provides the vehicle ceiling connecting arrangement to assume the ceiling attachment state.

According to an example embodiment, the ceiling attachment element may comprise a guiding structure in the recess portion; the guiding structure extends in a direction substantially parallel with the extension of the recess portion. Hereby, connection of the ceiling attachment element is simplified. The guiding structure may also provide the ceiling attachment element in a relatively tight fit to the elongated portion of the vehicle structure connecting portion. Hence, rather narrow tolerances can be accepted for achieving the tight fit.

According to an example embodiment, the elongated portion of the vehicle structure connection portion may comprise a first recess connecting surface arranged in abutment with a first surface of the recess portion when the vehicle ceiling connecting arrangement assumes the ceiling attachment state.

According to an example embodiment, the elongated portion of the vehicle structure connection portion may be sandwiched between the guiding structure and the first surface of the recess portion when the vehicle ceiling connecting arrangement assumes the ceiling attachment state.

Hereby, and as also indicated above, the ceiling attachment element can be well guided into its connected position, where a relatively tight fit is achieved between the elongated portion of the vehicle structure connection portion and the ceiling attachment element.

According to an example embodiment, the first surface of the recess portion may comprise a through-hole and the elongated portion of the vehicle structure connection portion comprises a protrusion, the protrusion being arranged to snap-fit into the through-hole when the vehicle ceiling connecting arrangement assumes the ceiling attachment state.

Hereby, when the vehicle ceiling connecting arrangement assumes the ceiling attachment state, the protrusion snaps into the through-hole, thus providing an improved connection between the ceiling attachment element and the vehicle structure connection portion. Also, when disconnecting the ceiling attachment element from the vehicle structure connection portion, it suffices to release the protrusion from the through hole and move the ceiling attachment element away from the first surface of the vehicle structure.

According to an example embodiment, the ceiling clamping surface may comprise at least one elongated protruding portion.

As described above, the ceiling clamping surface may preferably be arranged on each side of recess. Thus, the ceiling clamping surface extends in a direction away from the recess. The at least one elongated protruding portion may preferably extend in a direction substantially perpendicular to the extension of the ceiling clamping surface relative the recess. Hence, the at least one elongated protruding portion may preferably extend in the same direction as a horizontal component of movement of the ceiling attachment element when connecting the ceiling attachment element to the vehicle structure connection portion.

According to an example embodiment, the vehicle structure connection portion may comprise a rib structure facing the inner compartment of the vehicle. Hereby, improved bending stiffness of the vehicle structure connection portion is achieved.

According to a second aspect, there is provided a ceiling attachment element for attaching a vehicle ceiling to a vehicle structure of a vehicle, wherein the ceiling attachment element comprises a ceiling clamping surface and a recess portion extending in a non-parallel direction from the ceiling clamping surface, wherein the ceiling attachment element is connectable to a vehicle structure connection portion of the vehicle structure, in which the vehicle structure connection portion is inserted into the recess portion of the ceiling attachment element such that a portion of the vehicle ceiling is arranged in abutment with the ceiling clamping surface.

Effects and features of the second aspect are largely analogous to those described above in relation to the first aspect.

According to a third aspect, there is provided a vehicle comprising a vehicle structure and a vehicle ceiling, wherein the vehicle further comprises a vehicle ceiling connecting arrangement according to any one of the embodiments described above in relation to the first aspect for attaching the vehicle ceiling to the vehicle structure.

Effects and features of the third aspect are largely analogous to those described above in relation to the first aspect.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein:

FIG. 2 is a schematic illustration of a vehicle ceiling connecting arrangement before attaching to a vehicle ceiling according to an example embodiment;

DETAILED DESCRIPTION

Figure 1:
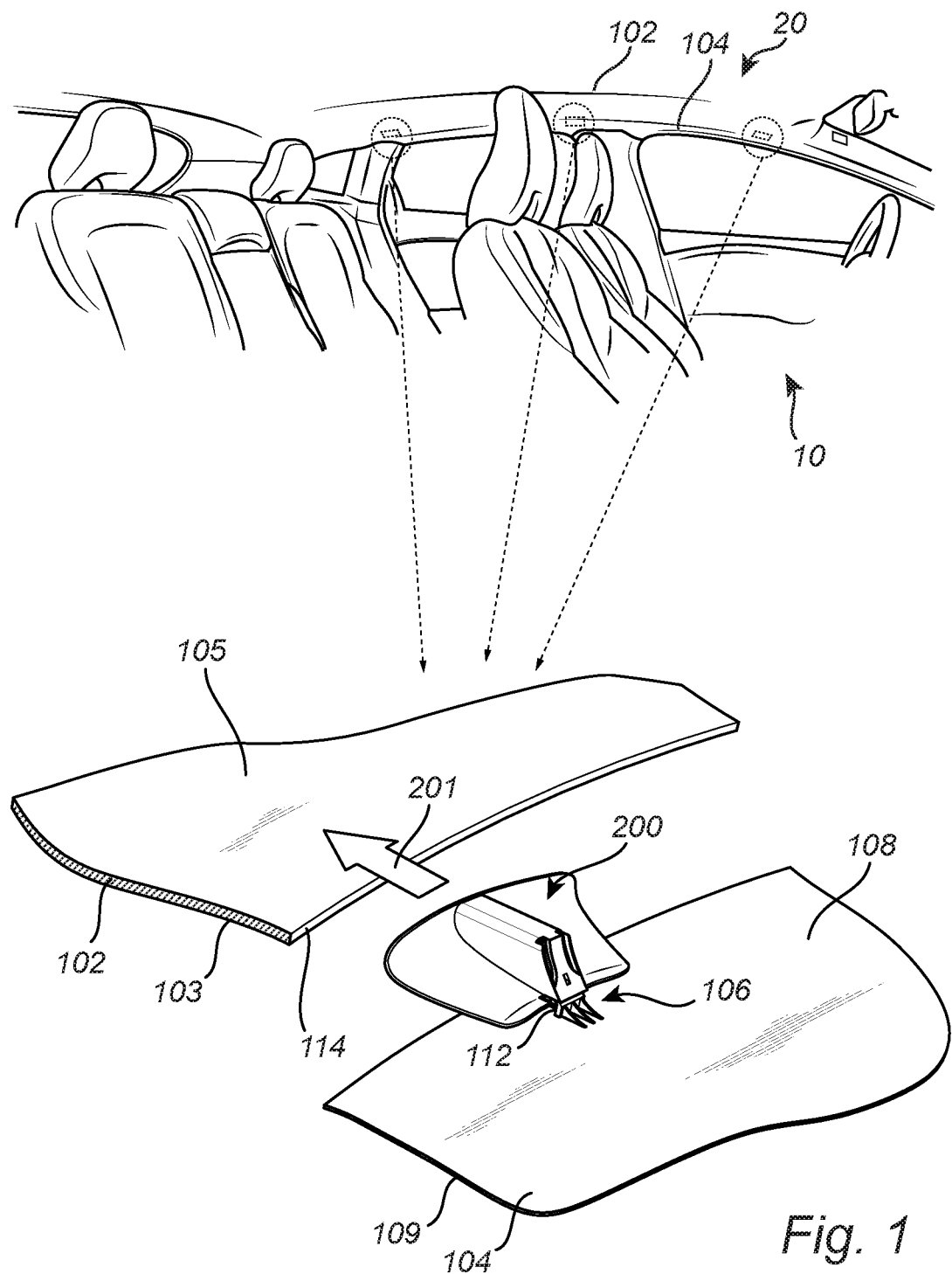
FIG. 1 is a perspective view illustrating an interior compartment of a vehicle according to an example embodiment.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With reference to FIG. 1, an example embodiment of an interior compartment 10 of a vehicle 20 is depicted. As can be seen, the vehicle 20 comprises a vehicle ceiling 102 facing the interior compartment 10. The vehicle ceiling 102 is also commonly referred to as a headliner of the vehicle 20. The vehicle ceiling 102 is thus connected to a vehicle structure 104 of the vehicle 20. The vehicle structure 104 may form part of a panel inside the vehicle, which panel may be the so called D-panel. The vehicle structure 104 may however form part of other structures that are arranged to be attached to the vehicle ceiling 102.

As can be seen in the cut-out portion of FIG. 1, the vehicle structure 104 is connectable to the vehicle ceiling 102 by moving the vehicle structure 104 towards the vehicle ceiling 102. The vehicle structure 104 comprises a first surface 108 facing away from the interior compartment 10 of the vehicle 20, and a second surface 109 facing the interior compartment 10 of the vehicle 20. Likewise, the vehicle ceiling 102 comprises a first vehicle ceiling surface 103 facing the interior compartment 10 of the vehicle 20 and a second vehicle ceiling surface 105 facing away from the interior compartment 10 of the vehicle 20.

Furthermore, the vehicle structure 104 comprises a vehicle structure connection portion 106 (illustrated in detail in e.g. FIG. 5) connected to the first surface 108 of the vehicle structure 104. The vehicle structure connection portion 106 comprises an elongated portion 110 (see FIG. 5) extending away from the first surface 108 in a non-parallel direction from the first surface 108. When the vehicle ceiling 102 and the vehicle structure 104 are connected to each other, the vehicle structure connection portion 106 can preferably act as a stop element for the vehicle ceiling 102. Hereby, an edge surface 114 is preferably in contact with an inner end surface 112 of the vehicle structure connection portion 106. Further details of the vehicle structure connection portion 106 will be given below in relation to e.g. the description of FIG. 5.

Figure 3A:
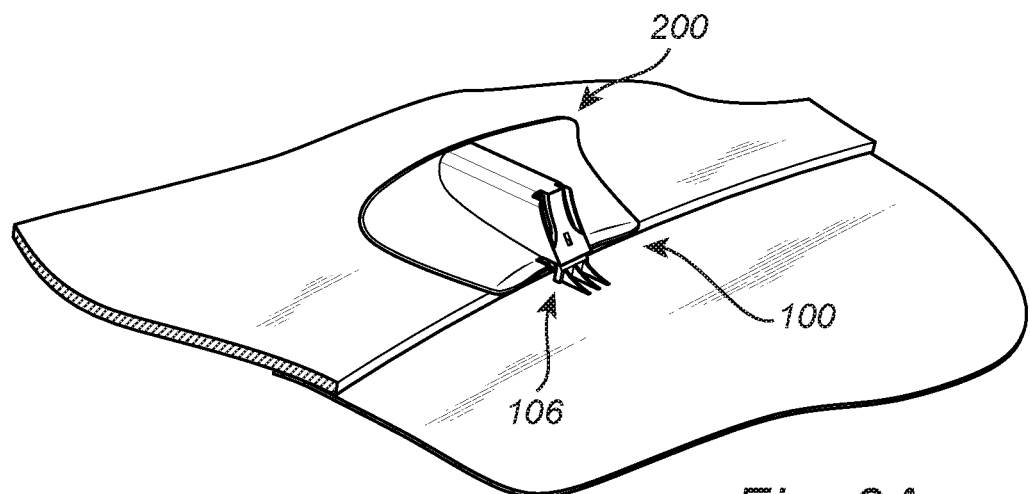
FIGS. 3a-3b are schematic illustrations of the vehicle ceiling connecting arrangement in FIG. 2 when attaching the vehicle structure to the vehicle ceiling according to an example embodiment.
Figure 3B:
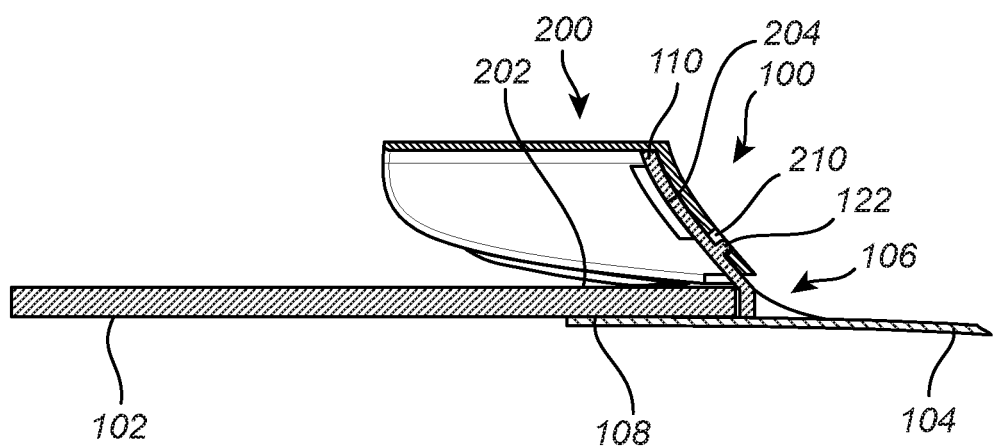

In order to describe the attachment between the vehicle ceiling 102 and the vehicle structure 104 in further detail, reference is made to FIGS. 2-3b which illustrate a vehicle ceiling connecting arrangement 100 according to an example embodiment. In detail, FIG. 2 illustrates the vehicle ceiling connecting arrangement 100 in a disconnected state from the vehicle ceiling 102, whereas FIGS. 3a-3b illustrate the vehicle ceiling connecting arrangement 100 in a ceiling attachment state in which the ceiling attachment element 200 and the vehicle structure connection portion 106 is connected to the vehicle ceiling 102.

Starting with FIG. 2 which hence illustrates a cross-section of the vehicle ceiling connecting arrangement 100 in a disconnected state. The vehicle ceiling connecting arrangement 100 thus comprises the ceiling attachment element 200 which, when attaching the vehicle ceiling 102 and the vehicle structure 104 to each other, is connected to the elongated portion 110 of the vehicle structure connection portion 106. In detail, the vehicle structure 104, including the vehicle structure connection portion 106, and the ceiling attachment element 200 is moved in a direction 201 towards the vehicle ceiling 102.

As depicted in FIG. 2, when attaching the vehicle ceiling 102 and the vehicle structure 104 to each other, the edge surface 114 of the vehicle ceiling 102 is directed towards the inner end surface 112 of the vehicle structure connection portion 106. Hereby, a portion of the first vehicle ceiling surface 103 of the vehicle ceiling 102 will face the first surface 108 of the vehicle structure 104. The second vehicle ceiling surface 105 will on the other hand face a ceiling clamping surface 202 of the ceiling attachment element 200. Further details of the ceiling attachment element 200 will be given below, mainly in relation to the description of FIGS. 4a-4c.

Turning to FIGS. 3a-3b which illustrate the vehicle ceiling connecting arrangement 100 in the ceiling attachment state, i.e. a connected state, where FIG. 3a is a perspective view of the vehicle ceiling connecting arrangement 100 and FIG. 3b is a cross-section of the vehicle ceiling connecting arrangement 100 from the side. As can be seen in FIGS. 3a-3b, the ceiling attachment element 200 is connected to the vehicle structure connection portion 106 by means of the elongated portion 110 being arranged into the recess portion 204 of the ceiling attachment element 200. As further depicted, the vehicle ceiling 102 is sandwiched between the first surface 108 of the vehicle structure 104 and the ceiling clamping surface 202 of the ceiling attachment element 200 when the vehicle ceiling connecting arrangement 100 assumes the ceiling attachment state. Preferably, the ceiling clamping surface 202 is substantially parallel to the first surface 108 of the vehicle structure when the vehicle ceiling connecting arrangement 100 assumes the ceiling attachment state.

Moreover, the elongated portion 110 of the vehicle structure connection portion 106 preferably comprises a protrusion 122 and the recess portion 204 comprises a through-hole 210. Hereby, when the elongated portion 110 is inserted into the recess portion 204, a snap-fit connection between the protrusion 122 and the through-hole 210 is provided. Hereby, a relatively secure connection is provided which reduces the risk that the ceiling attachment element 200 is accidentally disconnected from the vehicle structure connection portion 106. At the same time, the snap-fit enables for easy and quick disconnection of the ceiling attachment element 200.

Figure 4A:
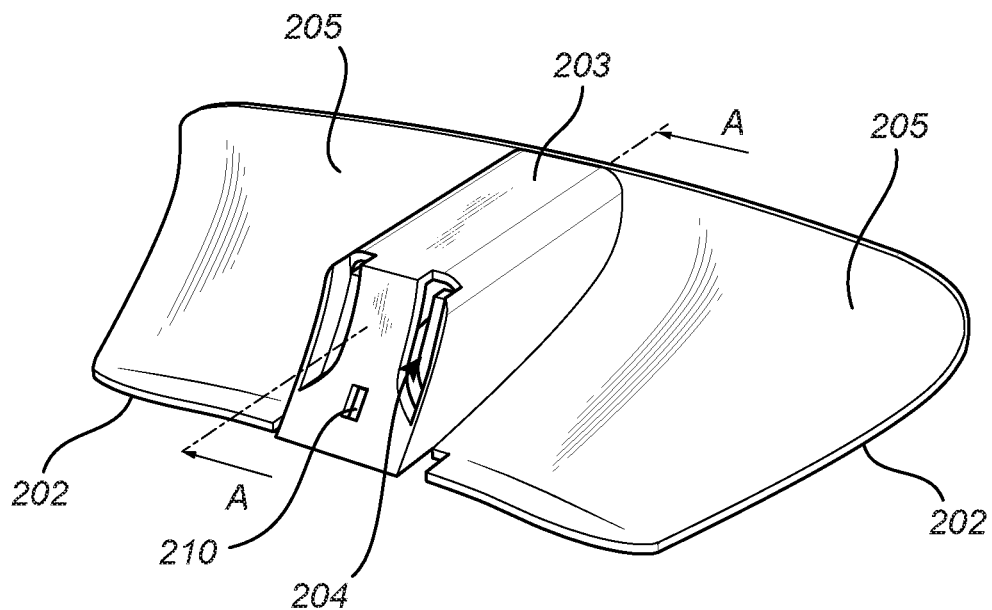
FIGS. 4a-4b are schematic illustrations of a ceiling attachment element according to an example embodiment.
Figure 4B:
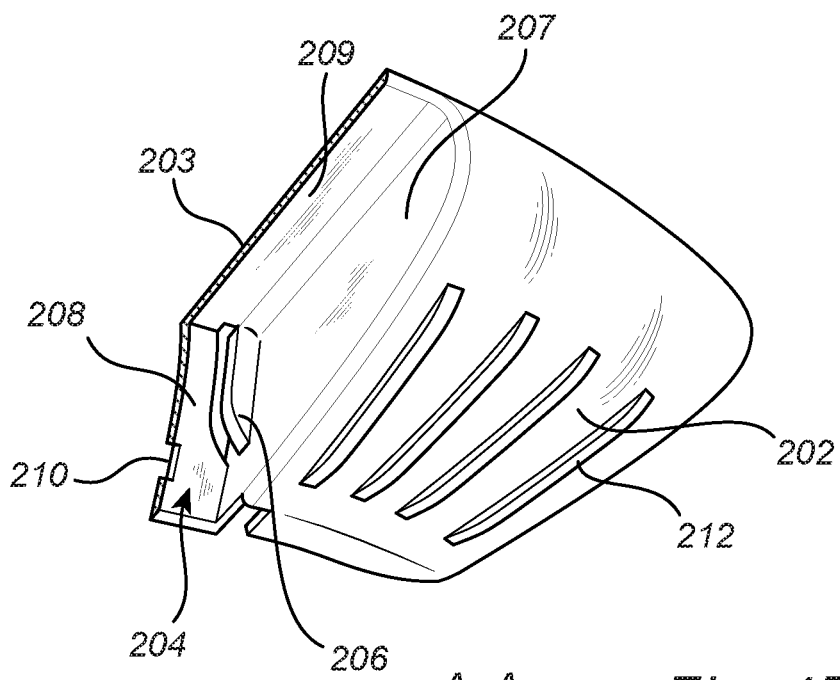

Turning now to FIGS. 4a-4b which illustrate various views of the ceiling attachment element 200 according to an example embodiment. In detail, FIG. 4a is a perspective top view of the ceiling attachment element 200 and FIG. 4b is perspective cut-out view illustrating the ceiling attachment element 200 from below.

Starting with FIG. 4a, the ceiling attachment element 200 comprising a housing 203 formed by the above described recess portion 204. The ceiling attachment element 200 further comprises wing-shaped portions 205 extending away from the housing 203. The wing-shaped portions 205 comprise the above described ceiling clamping surface 202 on an underside thereof. Thus, the ceiling clamping surfaces 202 are arranged on each side of the housing 203, i.e. on each lateral side of the recess portion 204. The housing further comprises the above described through-hole 210 arranged to receive the protrusion 122 of the vehicle structure connection portion 106.

Turning to FIG. 4b, which is a cut-out view at the cross-section A-A of FIG. 4a. It should thus be readily understood that the ceiling attachment element 200 is symmetric at the cross-section A-A. As can be seen, the recess portion 204 of the ceiling attachment element 200 comprises a first surface 208 at which the through-hole 210 is provided. The recess portion 204 also comprises a guiding structure 206 arranged at a distance from the first surface 208. Hereby, the elongated portion 110 of the vehicle structure connection portion 106 is preferably sandwiched in the recess portion 204 between the first surface 208 and the guiding structure 206 when the vehicle ceiling connecting arrangement 100 assumes the ceiling attachment state. The recess portion 204 also comprises side surfaces 207 and a top surface 209, wherein the side surfaces 207 are substantially perpendicular to the first surface 208 of the ceiling attachment element 200 and the top surface 209 is substantially perpendicular to the side surfaces 207 as well as to the first surface 208 of the ceiling attachment element 200.

As is further depicted in FIG. 4b, the ceiling clamping surface 202 comprises at least one elongated protruding portion 212. The elongated protruding portion 212 protrudes in a direction away from the ceiling clamping surface 202 and has an extension in a direction corresponding to a horizontal component of the elongated portion 110 of the vehicle structure connection portion 106. Hereby, the elongated protruding portion(s) will clamp the vehicle ceiling to the first surface 108 of the vehicle structure 104.

Furthermore, when the vehicle ceiling connecting arrangement assumes the ceiling attachment state, i.e. the ceiling attachment element 200 is connected to the vehicle structure connection portion 106, the ceiling clamping surface 202, as well as the elongated protruding portion 212 are arranged substantially parallel to the first surface 108 of the vehicle structure 104. The recess portion 204 on the other hand preferably extends in a non-parallel direction from the ceiling clamping surface 202. Preferably, the first surface 208 of the recess portion 204 and the guiding structure 206 are arranged in a direction substantially parallel with the elongated portion 110 of the vehicle structure connection portion 106 when the vehicle ceiling connecting arrangement assumes the ceiling attachment state.

Figure 5:
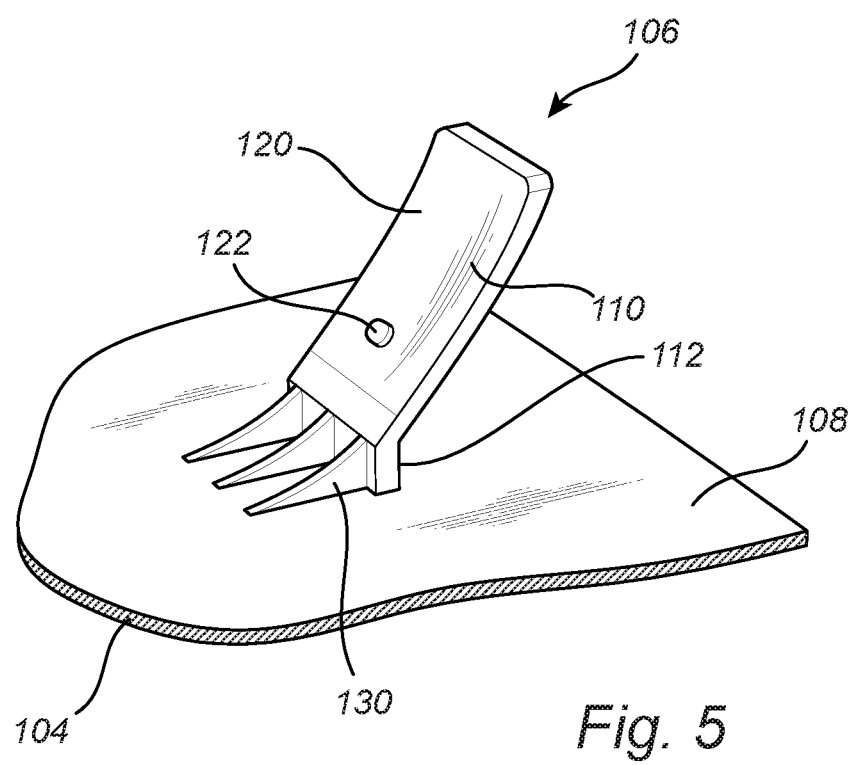
FIG. 5 is a schematic illustration of a vehicle structure connection portion according to an example embodiment.

Reference is finally made to FIG. 5 which is a perspective view of the vehicle structure connection portion 106 according to an example embodiment. As can be seen, and as described above, the vehicle structure connection portion 106 is arranged on the first surface 108 of the vehicle structure 104. The vehicle structure connection portion 106 comprises an elongated portion 110 extending in a direction non-parallel and away from the first surface 108. The vehicle structure connection portion 106 is preferably elastic/flexible for simplifying the connection to the recess portion 204 of the ceiling attachment element 200.

Moreover, the vehicle structure connection portion 106 comprises a first recess connecting surface 120 arranged on the elongated portion 110. The first recess connecting surface 120 is arranged in abutment with the above described first surface 208 of the recess portion 204 when the vehicle ceiling connecting arrangement 100 assumes the ceiling attachment state.

Furthermore, the vehicle structure connection portion 106 comprises a rib structure 130. As can be seen in FIG. 5, the rib structure 130 is further connecting the elongated portion 110 to the first surface 108 of the vehicle structure 104. Hereby, the interconnection between the vehicle structure connection portion 106 and the vehicle structure 104 is improved. The rib structure 130 is preferably arranged as an extension of the first recess connecting surface 120.

It is to be understood that the present invention is not limited to the embodiments described above and illustrated in the drawings; rather, the skilled person will recognize that many changes and modifications may be made within the scope of the appended claims.

What is claimed is:

1. A vehicle ceiling connecting arrangement for attaching a vehicle ceiling to a vehicle structure, said vehicle ceiling connecting arrangement comprising:
 a vehicle structure connection portion arranged at a first surface of the vehicle structure, said first surface facing away from an inner compartment, wherein said vehicle structure connection portion comprises an elongated portion extending from the first surface of the vehicle structure in a non-parallel direction relative to the first surface of the vehicle structure; and
 a ceiling attachment element separate from and connectable to the vehicle structure connection portion, said ceiling attachment element comprising a ceiling clamping surface and a recess portion extending in a non-parallel direction from the ceiling clamping surface, wherein the vehicle ceiling connecting arrangement is configured to assume a ceiling attachment state in which a portion of the vehicle ceiling is sandwiched between the first surface of the vehicle structure and the ceiling clamping surface, said ceiling attachment state is assumed when the elongated portion of the vehicle structure connection portion is inserted into the recess portion with the vehicle structure connection portion directly contacting and acting as a stop for an edge of the portion of the vehicle ceiling that is sandwiched between the first surface of the vehicle structure and the ceiling clamping surface,
 wherein the vehicle ceiling comprises a headliner.

2. The vehicle ceiling connecting arrangement according to claim 1, wherein the ceiling clamping surface is substantially parallel to the first surface of the vehicle structure when the vehicle ceiling connecting arrangement assumes the ceiling attachment state.

3. The vehicle ceiling connecting arrangement according to claim 1, wherein the ceiling clamping surface is arranged on each side of the recess portion.

4. The vehicle ceiling connecting arrangement according to claim 1, wherein an inner end surface of the elongated portion is arranged in abutment with an edge surface of the vehicle ceiling when the vehicle ceiling connecting arrangement assumes said ceiling attachment state.

5. The vehicle ceiling connecting arrangement according to claim 1, wherein the ceiling attachment element comprises a guiding structure in said recess portion, said guiding structure extends in a direction substantially parallel with an extension of the recess portion.

6. The vehicle ceiling connecting arrangement according to claim 1, wherein the elongated portion of the vehicle structure connection portion comprises a first recess connecting surface arranged in abutment with a first surface of the recess portion when the vehicle ceiling connecting arrangement assumes the ceiling attachment state.

7. The vehicle ceiling connecting arrangement according to claim 6, wherein the elongated portion of the vehicle structure connection portion is sandwiched between a guiding structure and the first surface of the recess portion when the vehicle ceiling connecting arrangement assumes the ceiling attachment state.

8. The vehicle ceiling connecting arrangement according to claim 6, wherein the first surface of the recess portion comprises a through-hole and said elongated portion of the vehicle structure connection portion comprises a protrusion, said protrusion being arranged to snap-fit into said through-hole when the vehicle ceiling connecting arrangement assumes the ceiling attachment state.

9. The vehicle ceiling connecting arrangement according to claim 1, wherein the ceiling clamping surface comprises at least one elongated protruding portion.

10. The vehicle ceiling connecting arrangement according to claim 1, wherein the vehicle structure connection portion comprises a rib structure facing the inner compartment.

11. A ceiling attachment element for attaching a vehicle ceiling to a vehicle structure of a vehicle, wherein the ceiling attachment element comprises a ceiling clamping surface and a recess portion extending in a non-parallel direction from the ceiling clamping surface, wherein the ceiling attachment element is connectable to a vehicle structure connection portion of the vehicle structure, in which the vehicle structure connection portion is inserted into the recess portion of the ceiling attachment element such that a portion of the vehicle ceiling is arranged in abutment with and clamped by the ceiling clamping surface with the vehicle structure connection portion directly contacting an edge of and acting as a stop for an edge of the vehicle ceiling that is arranged in abutment with and clamped by the ceiling clamping surface, wherein the vehicle ceiling comprises a headliner.

12. A vehicle comprising the vehicle structure and the vehicle ceiling, wherein the vehicle further comprises the vehicle ceiling connecting arrangement according to claim 1 for attaching the vehicle ceiling to the vehicle structure.

\* \* \* \* \*